US006850421B2

(12) United States Patent
Boyd

(10) Patent No.: US 6,850,421 B2
(45) Date of Patent: Feb. 1, 2005

(54) FUSE RELAY BOX APPARATUS, METHODS AND ARTICLES OF MANUFACTURE

(75) Inventor: Kenneth S. Boyd, Yadkinville, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/113,513

(22) Filed: Apr. 1, 2002

(65) Prior Publication Data

US 2003/0184988 A1 Oct. 2, 2003

(51) Int. Cl.[7] .......................... H01H 85/20; H02B 1/18

(52) U.S. Cl. ....................... 361/833; 361/822; 361/797; 361/834; 361/837; 439/752

(58) Field of Search ................................ 361/833, 819, 361/822, 752, 797, 724, 834, 837; 439/752

(56) References Cited

U.S. PATENT DOCUMENTS

| | | | | | |
|---|---|---|---|---|---|
| 4,772,759 | A | * | 9/1988 | Roy et al. | 174/17 VA |
| 5,179,503 | A | * | 1/1993 | Fouts et al. | 361/729 |
| 5,531,345 | A | * | 7/1996 | Nakamura et al. | 220/3.8 |
| 6,108,202 | A | * | 8/2000 | Sumida | 361/690 |
| 6,468,091 | B2 | * | 10/2002 | Roussel et al. | 439/72 |

* cited by examiner

*Primary Examiner*—Kamand Cuneo
*Assistant Examiner*—Hung S. Bui

(57) ABSTRACT

Fuse relay box apparatus, methods and articles of manufacture are shown. A fuse relay box comprises a cover and base, with optional seal. The base comprises a number of channels adapted for use by either a fuse or relay. Some channels may be useable by a diode as well. Terminals for the contacts of these components are connected to the contacts of the components through the channels. Mounting flexibility is also provided so the box is either side or bottom mounted.

6 Claims, 5 Drawing Sheets

FUSE RELAY BOX APPARATUS, METHODS AND ARTICLES OF MANUFACTURE

FIELD OF THE INVENTION

The present invention relates to electrical components. More particularly, the present invention relates to electrical component housings such as fuse relay boxes and the like.

BACKGROUND OF THE INVENTION

The use of a housing, or box, in vehicles for electrical components such as fuses and relays has become fairly common. These mixed use boxes (known as fuse relay boxes) provide an advantage by decreasing the space required in the vehicle's internals. Separate boxes for fuses and relays require more space. Additionally, separate boxes may require more bulky wiring to the boxes, as the fuse wires and any harnesses likely require a separate path to a fuse box from the path taken by relay wires and any harnesses to a relay box.

Fuse relay boxes, however, may bring their own complications. Placing fuses and relays in a single box is often accomplished through engineering specific areas of the box for a specific fuse or relay component. Wiring connecting those fuse-specific or relay-specific areas must also be routed to that area of the box. Thus, any changes to fuse placement and/or fuse wiring placement in the box, or relay placement, and/or relay wiring placement in the box, can only be made with difficulty, and would require reconfiguration of the entire box.

Because of the limited reconfiguration potential of these fuse relay boxes (which occasionally includes diodes as well, leading to yet another level of complication), these boxes are vehicle specific. They cannot be used in different vehicle models. A fuse relay box for a specific vehicle model with a fixed configuration of fuses and relays for that specific vehicle model usually cannot be used in a different vehicle model as that second vehicle model may have a different set of fuses, relays and diodes. A new box must be engineered.

Additionally, a fixed configuration box often lacks mounting flexibility because the box requires a specific mounting on the vehicle. Once design of that mounting is set, there is little or no ability to modify or move that mounting to accommodate new wiring and fuse or relay requirements.

Thus, it would be beneficial if a fuse relay box is provided that allows for flexible component placement throughout the box. Such a box would likely eliminate the need for fixed configuration fuse relay boxes and provide flexibility in configuring fuse, relay, diode and wire placement. It would also be beneficial if a fuse relay box could be provided with flexible mounting requirements, further simplifying vehicle design.

Accordingly, it is an object of the present invention to provide fuse relay box apparatus, methods and articles of manufacture.

It is a further object of the present invention to provide a user configurable fuse relay box apparatus, methods and articles of manufacture.

It is a further object of the present invention to provide a user configurable fuse relay box apparatus, methods and articles of manufacture with flexible mounting requirements.

SUMMARY OF THE INVENTION

The summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown.

The present invention comprises fuse relay box apparatus, methods and articles of manufacture. The preferred embodiments comprise a cover and power distribution module base. Fuses, relays and diodes (referred to herein as "electrical components") may be installed upon the base. A cover seal may also be used in certain preferred embodiments. Both the cover and any seal help protect the components installed on the base from the environment.

Channels are provided that extend vertically through the base and are adapted for receiving the components. The cross shaped top of any given channel receives a blade contact from an electrical component. The contact blade fits within a slot of the cross, while the remaining slot provides access for removal of the terminal. Certain channels are configured to accept diodes as well, by use of an extra slot provided within a leg of a cross. This slot may not be used if fuses or relays are installed therein.

The blade contact extends partially through the channel from the top, and the bottom of the channel is configured so as to receive either sealed or unsealed terminals. A terminal is brought up through the bottom of a channel to mate with a blade contact of an electrical component depending downwardly from the top of the channel and so a mechanical and electrical connection is made through the channel between the blade contact and terminal. Maximum flexibility is thus provided by permitting individual blade-terminal connections in any channel. Thus, any desired electrical component configuration may be created throughout the fuse relay box.

Additionally, the preferred embodiments provide means for mounting that accommodate either a side mount, i.e. the box is mounted so its side is coextensive with a mounting substrate, or a bottom mount, i.e. the box is mounted so its bottom is coextensive with a mounting substrate.

Additional objects, advantages and novel features of the invention will be set forth in part in the description and figures which follow, and in part will become apparent to those skilled in the art on examination of the following, or may be learned by practice of the invention.

DETAILED DESCRIPTION OF THE PREFERRED EMBODIMENTS

Figure 1:
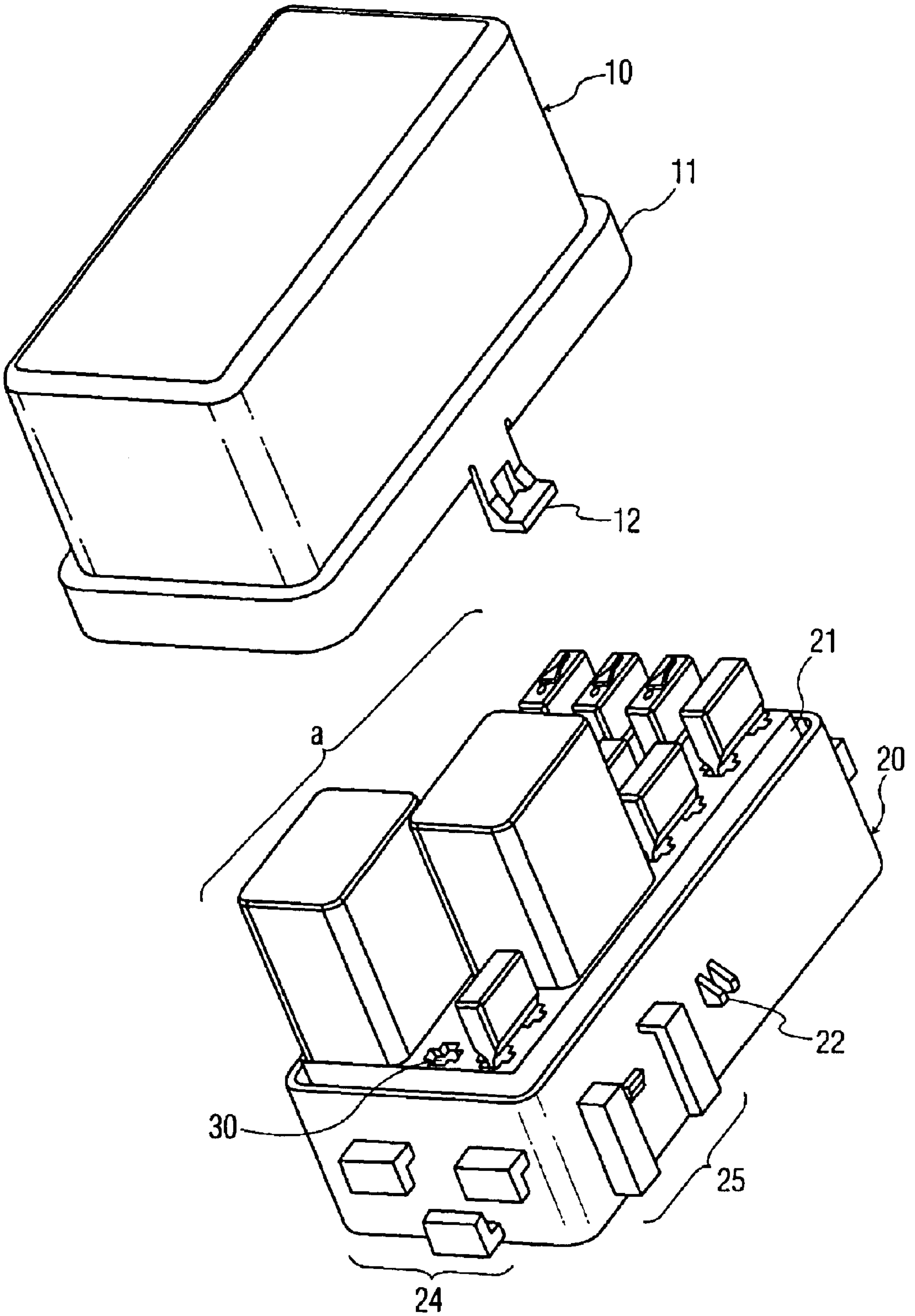
FIG. 1 shows a plan view of a preferred embodiment.
Figure 1A:
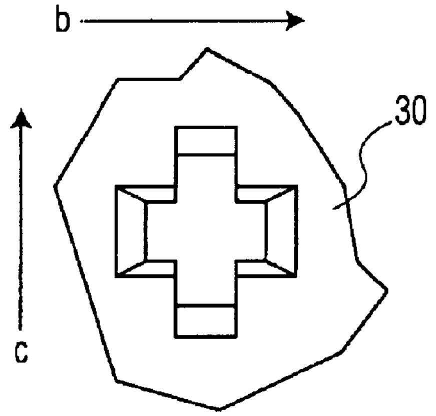
FIG. 1*a* is an isolated view of an area of FIG. 1.
Figure 1B:
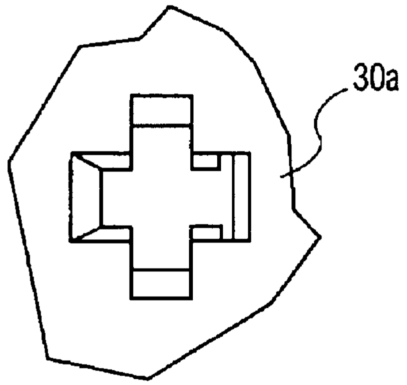
FIG. 1*b* is another isolated view of an area of FIG. 1.

FIG. 1 shows a preferred embodiment with installed electrical components a. The contacts of the components are installed within various vertical channels of the embodiment, which are adapted to receive the contacts from electrical components as well as mating terminals for those contacts. Also seen is the top of a single unused channel 30. Each channel has a cross shape, such as shown in the isolated view of FIG. 1*a,* which receives a contact blade from the component in the slot along the direction shown by the arrow b (the "blade direction.") The slot of each cross along the direction shown by the letter c (the "lateral direction") is provided for removal of the terminal by means as known in the art. In other preferred embodiments, one or more channels may have an additional slot across the end of a leg in the blade direction and parallel to the lateral direction for mounting diodes, as shown by FIG. 1*b,* which is a view of isolated channel 30*a.* However, the presence of these slots, or diode mounting means, does not prevent insertion of a fuse or relay, that is, the diode mounting means leaves the channel free for insertion of a fuse or relay, if desired. Indeed, some embodiments might have diode mounting means throughout the entire matrix, thus providing channels for installation of diodes, fuses or relays throughout.

In the preferred embodiments, any desired matrix of channels may be used as desired and so the shape of the embodiment may be different from embodiment to embodiment. For example, an embodiment may have a 4×9 matrix, a 6×6 matrix, etc. Moreover, the matrix of an embodiment may be sized for specific types of components, as will be further described below.

Returning to FIG. 1, when the embodiment is assembled, cover 10 is placed over base 20 and the exterior of collar 11 fits about step back 21, as is further described below. Cover 10 is latched on base 20 through latch 12 mating with lug 22 on base 20. A similar latch and lug arrangement is present on the side not shown here. Brackets shown generally at 24 and 25 on base 20 retain tabs for installation of the embodiment on any desired mounting area, as will be further described below. Other embodiments may locate brackets 24 or 25 or other mounting means on another area of the embodiment. Both cover and base are made, in the preferred embodiments of a suitable dielectric, fire retardant thermoplastic such as PP GF25 M30, although any suitable materials may be used in other embodiment.

As described above, in other embodiments, other means may be used to latch the cover onto the base. Of course, embodiments may dispense with latch means. Additionally, other means as known in the art, e.g. screws, may be used to install an embodiment on a mounting area, as is further described below. Also means may be used, through additional members, to route wires or wiring harnesses depending from the bottom of the various channels.

Figure 2:
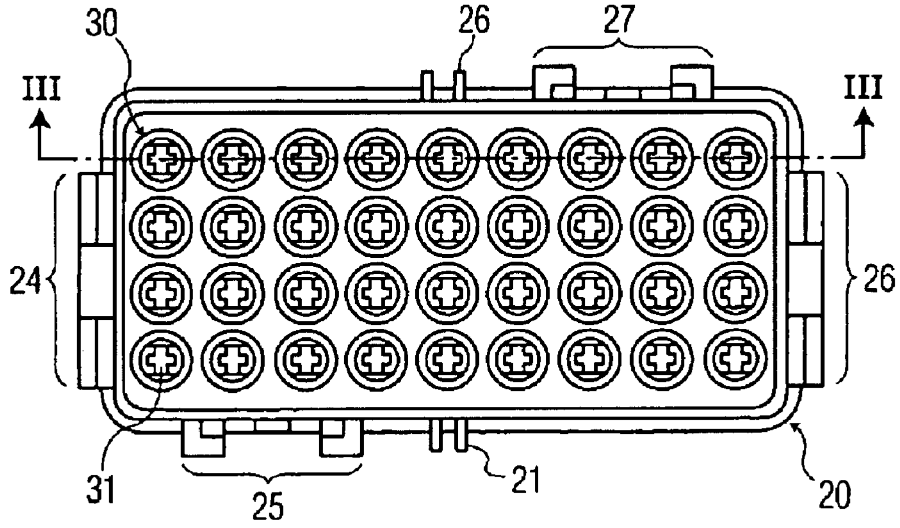
FIG. 2 shows another view of the embodiment of FIG. 1.

FIG. 2 is a view of the underside of base 20 without installed electrical components. A 4×9 matrix of channels 30 is seen. Engagement lugs 21 and 26 are seen, which mate with latches on the cover. Brackets 24, 25, 26 and 27 are also seen for mounting the embodiment on a substrate, as will be further described below. Also visible within a channel in FIG. 2 is groove 31, which provides for the leg of a removal tool to reach into the channel to remove the terminal if desired.

Figure 3:
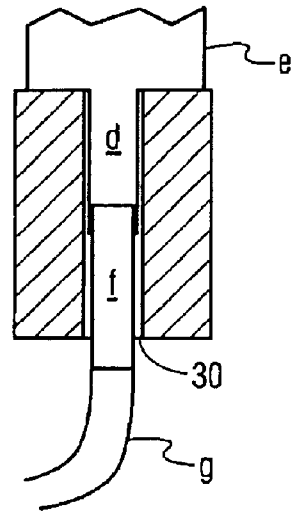
FIG. 3 is a cutaway view of an embodiment.

Turning briefly to FIG. 3, a cutaway view of a channel of an embodiment is seen. Here a blade contact d of an electrical component e is shown depending through a channel 30. A terminal f for the respective component wire g is shown installed as well. The components and wire terminals are as known in the art. In the especially preferred embodiments, the channels are dimensioned for MINI Fuses, MINI diodes, and Micro 280 relays and mating terminals, so the pitch between centerlines is 8.13 mm×7.8 mm, the diameter is sized to accommodate a 2.8 mm blade contact and components may be placed anywhere on the matrix, so long as any diode-specific channels are used appropriately. Of course, other components and terminals might lead to other dimensions. The terminals are appropriately mated with the blade contact, so, for example, the terminals used in the especially preferred embodiments may be AMP Junior Power Timer or AMP MCP 2.8, which also have a lock to help ensure their retention in the channel. Either sealed or unsealed terminals may be used. For example, sealed terminals may assist in protecting the contact-terminal connection and may assist in insulating the terminal from contact in the side of the channel.

The channel, in the preferred embodiments, leaves little play for the contact or terminal so that the mechanical and electrical connection between them may be made securely. Certain embodiments may have snap fit flange or other means to secure the terminals as well. Additionally, embodiments may use wires that are grouped together by way of harness or other means, to simplify installation.

Figure 4:
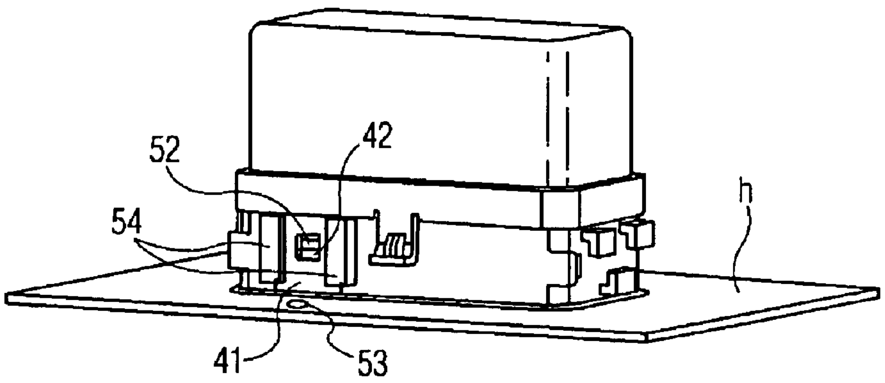
FIG. 4 shows a plan view of another embodiment.
Figure 4A:
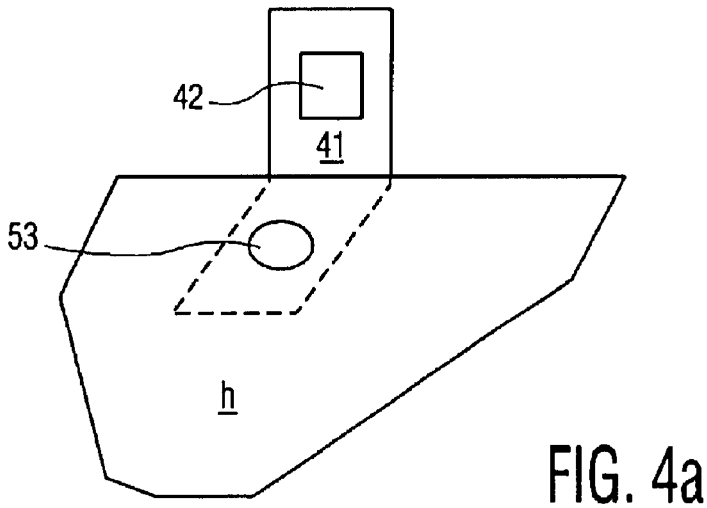
FIG. 4*a* shows a sectional view of the embodiment of FIG. 4.
Figure 5:
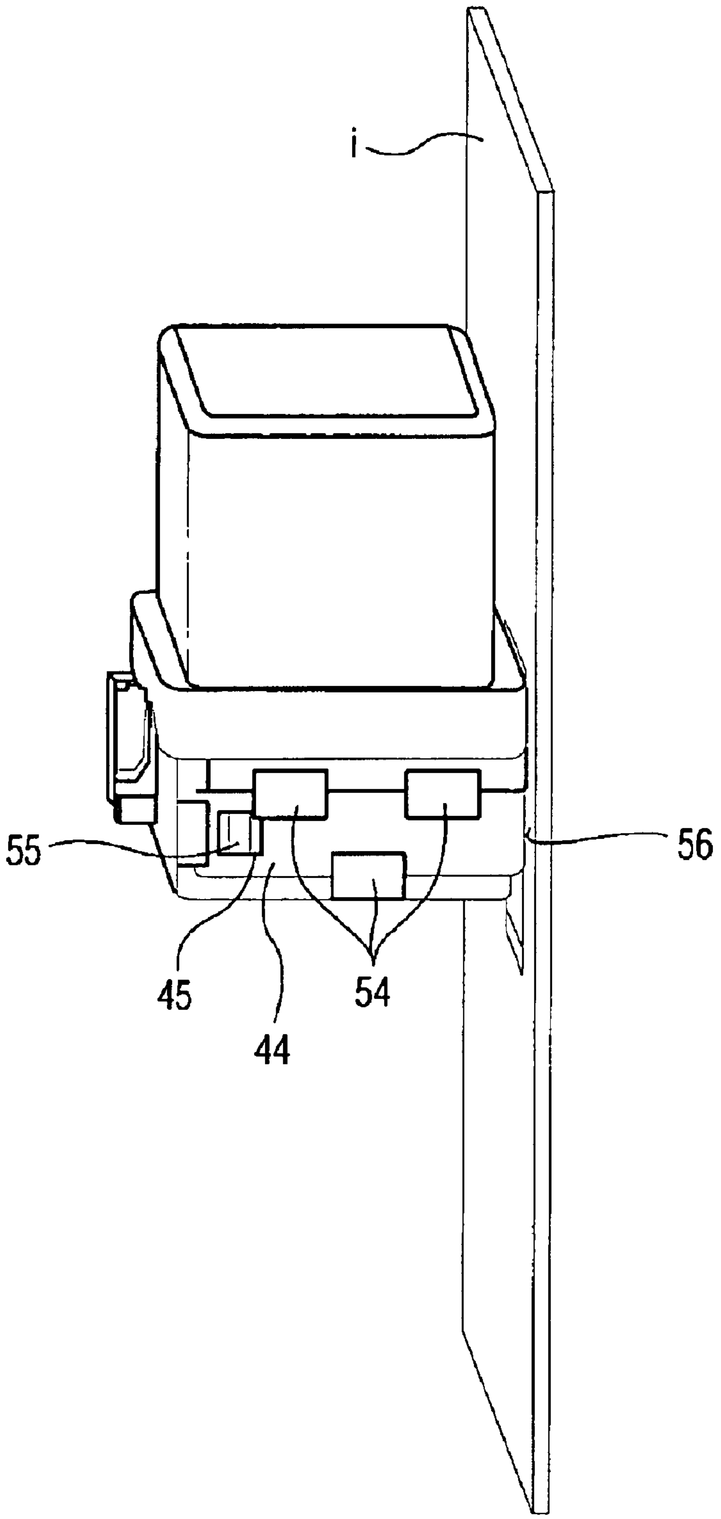
FIG. 5 shows a plan view of another embodiment.

Turning now to FIGS. 4 and 5, two views of embodiments are shown as mounted on substrates h and i, respectively. FIG. 4 shows a top mounted view, with tab 41 retained in bracket 51, and recess 42 in tab 41 sliding over lug 52 for a snap fit. A similar tab-bracket mounting exists on the side not shown. The tab 41 is affixed to the substrate by rivet 43, as can be seen in the cutaway view of FIG. 4*a* (which is of the bracket 41, recess 42, rivet 53 and substrate h, without a base.) The tab is constructed of stainless steel in the preferred embodiments although other materials as known in the art may be used.

FIG. 5 shows a side mounted view, with tab 44 retained in bracket 54, and a similar tab-bracket arrangement on the side not shown here.

Other mounting means may be used in other embodiments for either bottom or side mounting so long as sufficient strength exists to retain the box upon the substrate. For example, screws may be used, a U-shaped bracket may be used, preinstalled brackets on the base may be used, etc. If a wire routing member is used on a bottom mounted embodiment or embodiments, the mounting means may provide space between the base bottom and the substrate, so as to provide space for any gathered wires and/or any wire harness or harnesses as well.

Figure 6:
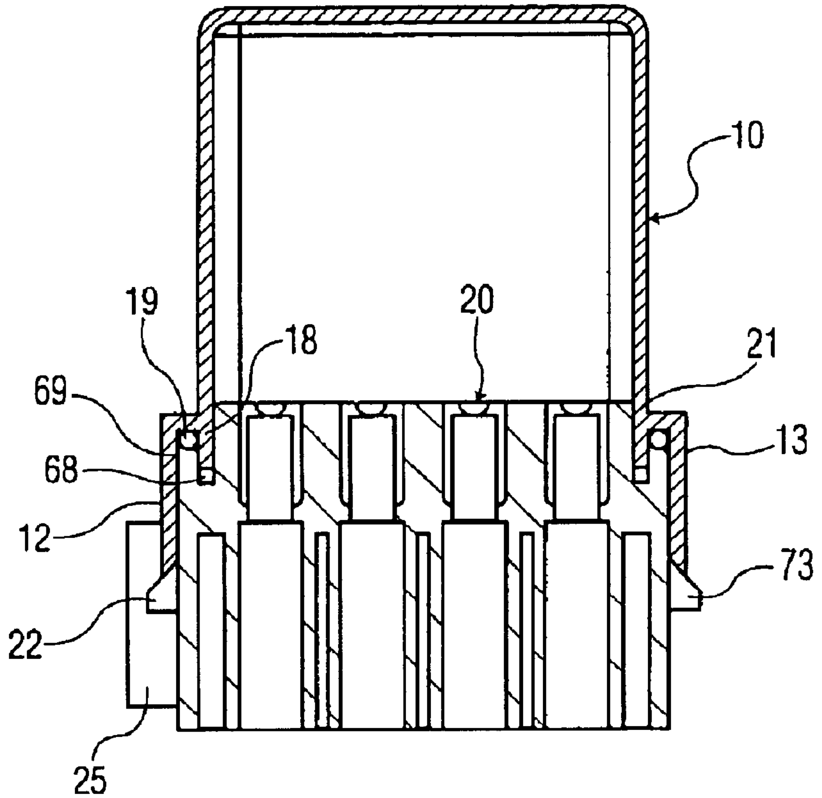
FIG. 6 shows a cross sectional of the embodiment of FIG. 1.

The preferred embodiments provide an interlocking mechanism between cover and base so as to assist in insulating the components from the environment. FIG. 6 shows a cross sectional view, of the embodiment of FIG. 1 without electrical components, with cover 10 installed. Here, the interlocking engagement of cover 10 and base 20 is seen. Recess 68, located proximate to step back 21, engages with inner projection 18 on cover 10. Upright projection 69 engages recess 19 on cover 10, and collar 13 surrounds base 10. Latch 12 engages lug 22, as does latch 13 and lug 73, to lock the cover 10 onto base 20. Bracket 25 is also seen. The interlocking arrangement provides protection against environmental degradation of the electrical components maintained within.

Figure 6A:
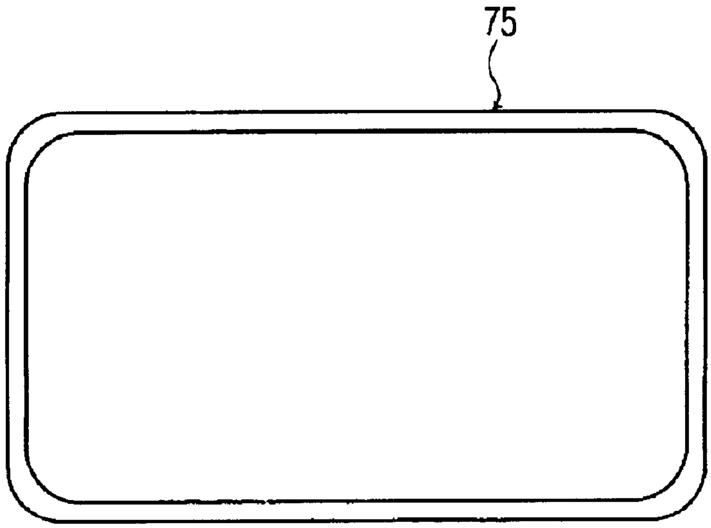
FIG. 6*a* shows a partial view of an embodiment.

It is also possible in various embodiments to use a seal, made of silicone or other material as known in the art, fitting within recesses 28 and/or 19. In this, and other preferred embodiments, the seal would be the shape of the cover and base, such as the seal 75 shown in FIG. 6*a.*

In various embodiments, channels may be configured so as to engage only certain types of contacts. For example, as was described above, diodes may be used with appropriate channel configurations in certain areas to ensure diodes are only placed in those areas. This arrangement inhibits installation flexibility, but may be desirable for safety reasons, maintenance reasons, etc.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

I claim:

1. A fuse relay box comprising:

a cover;

a base comprising a matrix of channels, with said channels adapted to interchangeably receive a fuse or relay blade contact from the top of said base, and said channel being further adapted to receive a terminal from the bottom of said base, wherein said terminal may be mated to said blade contact within said channel so as to make a mechanical and electrical connection, the base further adapted to receive said cover; and a mounting means, adapted for mounting said box on a substrate, wherein said mounting means is adapted for both bottom mounting and side mounting.

2. A fuse relay box as in claim 1, further comprising a seal means.

3. A fuse relay box comprising:

a cover; and a base comprising a matrix of channels, with said channels adapted to interchangeably receive a fuse or relay blade contact from the top of said base, and said channel being further adapted to receive a terminal from the bottom of said base, wherein said terminal may be mated to said blade contact within said channel so as to make a mechanical and electrical connection the base further adapted to receive said cover, wherein at least one of said channels is further adapted to receive a diode contact.

4. A fuse relay box, comprising:

a base having a matrix of orthogonal rows and columns of channels therethrough, said channels being configured to interchangeably receive a fuse contact or relay contact and positioned at a uniform pitch along each column and at a uniform pitch along each row, such that a fuse contact can be inserted into any one of said channels and a set of contacts from a relay can be inserted in any corresponding set of adjacent orthognal channels, said channels being further adapted to receive terminals from ends of said channels opposite said insertions, wherein said terminals can be mated to said contacts within said channels so as to make a mechanical and electrical connection, at least one channel being further adapted to receive a diode contact.

5. A fuse relay box comprising:

a base having a matrix of orthogonal rows and columns of channels therethrough, said channels being configured to interchangeably receive a fuse contact or a relay contact and positioned at a uniform pitch along each column and at a uniform pitch along each rows such that a fuse contact cap be inserted into any one of said channels and a set of contacts from a relay can be inserted in any corresponding set of adjacent orthogonal channels, said channels being further adapted to receive terminals from ends of said channels opposite said insertions, wherein said terminals can be mated to said contacts within said channels so as to make a mechanical and electrical connection, wherein said channels have a cross configuration comprising mutually bisecting orthogonal slots.

6. A fuse relay box as in claim 5, wherein one or more fuses and one or more relays may be flexibly positioned along both the rows and columns of said matrix of channel without changing the configuration of said base.

* * * * *